United States Patent [19]

Kraft et al.

[11] Patent Number: 4,850,300
[45] Date of Patent: Jul. 25, 1989

[54] APPARATUS FOR SPRAY COATING OF VESSEL MOUTHS WITH SILANES

[75] Inventors: Dieter Kraft, Rossdorf; Dieter Gröhser, Gross-Umstadt, both of Fed. Rep. of Germany

[73] Assignee: Merck Patent Gesellschaft mit Beschrankter Haftung, Darmstadt, Fed. Rep. of Germany

[21] Appl. No.: 152,712

[22] Filed: Feb. 5, 1988

[30] Foreign Application Priority Data

Feb. 7, 1987 [DE] Fed. Rep. of Germany ....... 3703870

[51] Int. Cl.$^4$ ................ B05C 11/06; B05C 13/00
[52] U.S. Cl. ..................... 118/63; 118/301; 118/321; 118/323; 118/326; 118/DIG. 3; 118/503; 118/505
[58] Field of Search .......... 118/63, 301, 318, 320, 118/321, 323, 326, DIG. 3, 503, 505; 427/348, 195, 185

[56] References Cited

U.S. PATENT DOCUMENTS

| | | | |
|---|---|---|---|
| 2,088,542 | 7/1937 | Westin | 118/301 X |
| 2,387,213 | 10/1945 | Chew et al. | 118/DIG. 3 X |
| 2,946,696 | 7/1960 | Lopenski | 118/301 X |
| 3,296,999 | 1/1967 | Gamble | 118/301 X |
| 3,423,234 | 1/1969 | Heine | 222/571 X |

Primary Examiner—Shrive Beck
Assistant Examiner—Alain Bashore
Attorney, Agent, or Firm—Millen, White & Zelano

[57] ABSTRACT

Vessel mouths (1) are provided with a silane coating in order to improve the pouring behavior. For this purpose, there is an apparatus which has, on a rotatable nozzle holder (14), several spray nozzles (16) and blowing nozzles (17) directed tangentially to the edge (1a) of the vessel mouth (1). A stationary nozzle mandrel (12) forms, by means of its lower centering portion (13), a centering means for the vessel mouth (1). An air flow flows from the centering portion (13) out of air nozzles (20) directed rearwards and prevents spray material from penetrating into the vessel (2). The spray residues and solvent vapors which occur are sucked off from a suction bell (21) surrounding the vessel mouth (1).

15 Claims, 2 Drawing Sheets

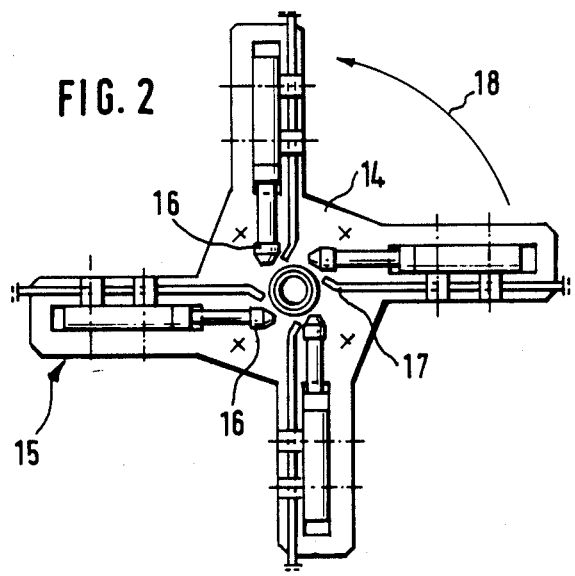
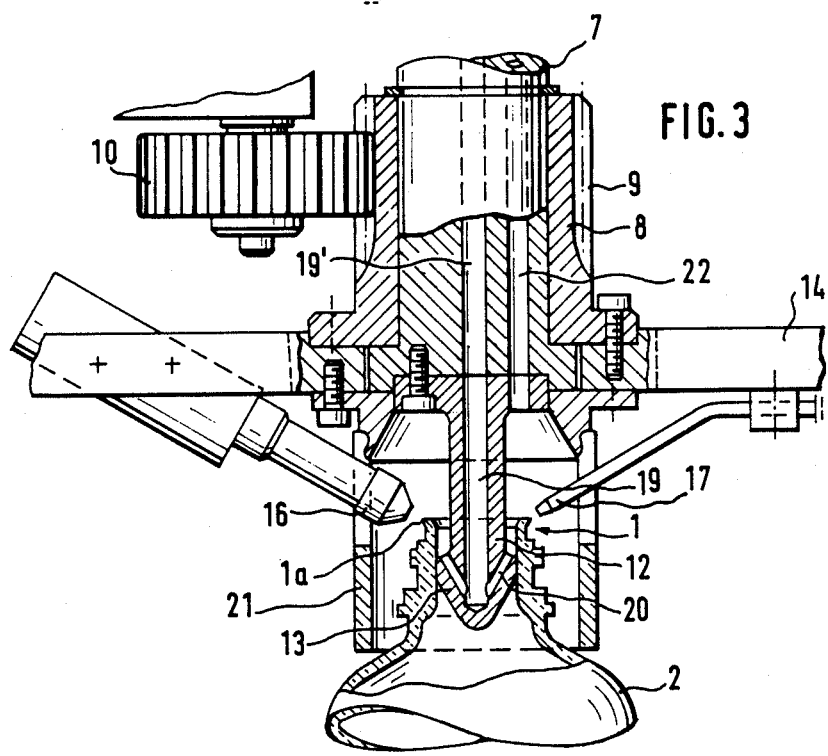

APPARATUS FOR SPRAY COATING OF VESSEL MOUTHS WITH SILANES

BACKGROUND OF THE INVENTION

The invention relates to an apparatus for spray coating of vessel mouths with at least one spray nozzle.

It is the case with many liquids, that there are difficulties in pouring them, because at the end of the pouring operation a residue of liquid runds down on the outside of the vessel mouth. The soiling of the vessels, for example glass bottles, caused thereby is undesirable and must be prevented, especially with regard to toxic, aggressive or otherwise dangerous liquids. For this purpose, pouring rings forming a sharp breakaway edge which assists the breakaway of the stream of liquid at the end of the pouring operation are conventtionally attached to the vessel mouths. On the other hand, these pouring rings consist of a plastic which usually has a lower surface affinity with the liquid than the glass surface.

The manufacture and attachment of these pouring rings involve a relatively high outlay in terms of production. The pouring rings do not prvent a residue of liquid from remaining on the end face of the vessel mouth, and in many cases this can lead to soiling or sticking of the vessel closure and is therefore undeseirable. As a result of the use of pouring rings, an additional gap, in which a residue of liquid can collect, is even formed between the pouring ring and the vessel mouth.

It is known that it is possible to do without these advantageous pouring rings if the vessel mouths are provided with a silane coating. The silane coating can be applied, for example, by immersion, by being brushed on or sprayed (U.S. Pat. No. 3,423,234). The silane coating prevents residues of liquid from dripping or from running down and also ensures that the likewise coated endn face of the vessel mouth remains free of liquid residues.

However, the silane coating of vessel mouths has hitherto not been put to practical use, because it has not been possible to carry out the coating operation n an economically satisfactory way during the mass production of glass bottles and other vessels.

SUMMARY OF THE INVENTION

The object of the invention is, therefore, to provide an apparatus of the type mentioned in the introduction, by means of which a spray coating of vessel mouths with silanes becomes possible, even in mass production, in the most efficient way possible in economic and technical terms.

According to the invention, this object is achieved in that the vessel to be treated is positioned, in that the spray nozzle and/or the vessel are rotatable relative to one another about the centre axis of the vessel mouth, and in that arranged next to the spray nozzle is a blowing nozzle pointing to the edge of the vessel mouth and trailing the spray nozzle.

Because the vessel mouth is centred and secured, it is brought into a fixed predetermined initial position in relation to the spray nozzle. During the subsequent relative rotation of the spray nozzle which can be executed as a result of a movement of the spray nozzle or of the vessel, the spray nozzle and the blowing nozzle trailing it in either case are guided in a predetermined arrangement and a predetermined distance relative to the vessel mouth, the spray coating being applied at the same time. An air stream or other gas stream flows out of the blowing nozzle and serves for smoothing and drying the coated vessel mouth.

The apparatus according to the invention can be incorporated in the production cycle for the manufacture of glass bottles or, in a racking installation, precede the racking operation (system independent of location). It is easily possible to change over to a different dimensions. The coating operation can be carried out automatically or else semi-automatically. The blowing nozzle trailing the spray nozzle ensures that, even if there are fluctuations in the coating, a smooth and dry mouth surface is obtained, without liquid silane residues or drops causing disruption in the subsequent work stations.

Appropriately, the spray nozzle and/or the blowing nozzle are directed approximately tangentially to the edge of the vessel mouth. This ensures that the spray jet and/or the smoothing and drying jet follow for as long as possible the surface which is to be coated. An especially intensive and quick-drying coating is thereby achieved.

According to a preferred embodiment of the invention, several units, each consisting of a spray nozzle and of a blowing nozzle, are arranged distributed over the periphery of the vessel mouth. The necessary relative rotation between the vessel and the nozzles then amounts to only a fraction of a complete revolution, this fraction depending on the number of nozzle units. Since coating is carried out simultaneously by several spray nozzles, there is considerable reduction in the time required for the work cycle as a whole. The individual nozzles can be connected to the associated supply and control devices via hose connections.

According to an especially advantageous embodiment of the invention, a nozzle mandrel which projects into the vessel mouth and is connected to an air supply line and which at the same time can serve for centering the vessel has, distributed on its periphery, several air nozzles directed rearwards to the vessel mouth, and the vessel mouth is surrounded by a suction bell substantially closed off relative to the outside and equipped with several suction lines.

The air stream flowing out of the air nozzles directed to the vessel mout prevent parts of the spray jet from entering the vessel neck. The spray effect is thereby limited to the desired region of the inside of the vessel mouth. The air stream flowing out of the vessel mouth and containing spray particles and solvent vapors and the sppray particles and the solventt vapors sprayed away on the outside of the vessel mouth are eliminated by means of the suction bell and therefore do not escape into the environment.

Further subclaims relate to further advantageous embodiments of the idea of the invention.

BRIEF DESCRIPTION OF THE DRAWINGS

The invention is explained in detail below with reference to an exemplary embodiment which is shown in the drawings. In the drawings:

FIG. 2 shows a view in the direction of the arrows II—II in FIG. 1, with the suction bell omitted, and FIG. 3 shows an enlarged vertical part section in the region of the nozzle mandrel of the apparatus according to FIG. 1.

DESCRIPTION OF THE PREFERRED EMBODIMENT

Figure 1:
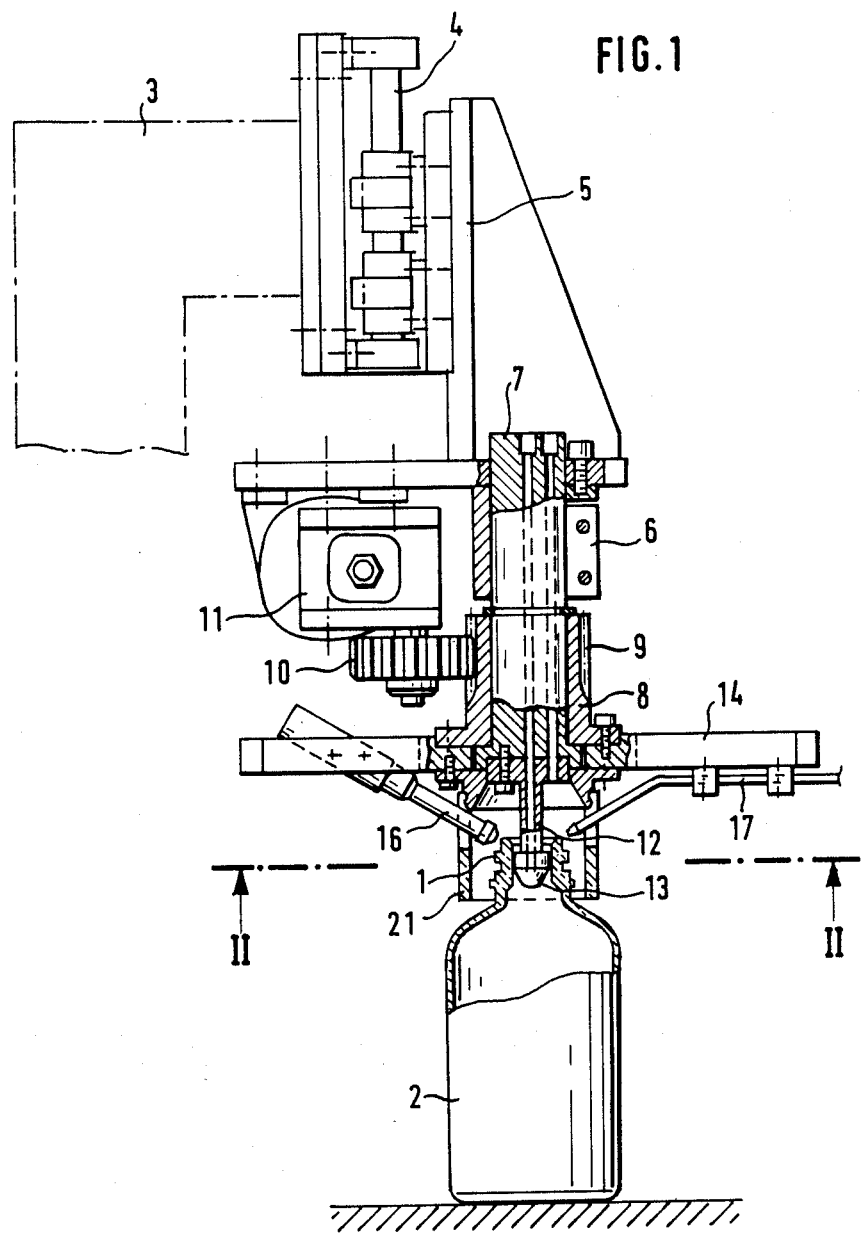
FIG. 1 shows a side view, partially in section, of an apparatus for spray coating of vessel mouths.

The apparatus illustrated in the drawing serves for providing the vessel mouths 1 in the necks of vessels 2 and similar containers, for example made of glass, with a silane coating, in order to improve the pouring behavior and make it unnecessary to use pouring rings. A slide guide 4 for a lifting slide 5 is attached to a pillar 3 merely indicated in FIG. 1. The lifting drive of the lifting slide 5 is obtained, for example, via a spindle mechanism (not shown).

Attached to the lifting slide 5 via a clamping bush 6 is a vertically adjustable supporting spindle 7, on which a bushing 8 is mounted rotatably at its lower end. The bushing 8 carries, on its periphery, a toothing 9 which is engaged with a driving gear wheel 10 of a rotary drive 11. The rotary drive 11 attached to the lifting slide 5 can have, for example, a rotary cylinder for driving the gear wheel 10.

Attached to the lower end of the supporting column 7, on its end face is a nozzle mandrel 12 which, by means of its lower thickened centering portion 13, fits into the vessel mouth 1 and the vessel neck of the vessel 2 and centers these.

Attached exchangably to the lower end face of the driven bush 8 is a star-shaped nozzle support 14 (FIG. 2) which supports, on each of its four arms, a nozzle nit 15 consisting of a spray gun with a spray nozzle 16 and a blowing nozzle 17.

As can be seen from FIG. 2, both the spray nozzle 16 and the blowing nozzle 17 are directed tangentially to teh periphery of the edge of the vessel mouth 1 to be coated. During the spraying opeation, the nozzle holder 14 is driven through approximately 90 degrees in the direction of rotation identified by an arrow 18 in FIG. 2, so that the blowig nozzle 17, out of which flows an air stream for smootthign and drying the coating, trails the spray nozzle 16 which sprays the coating onto the vessel mouth 1.

It can be seen from FIG. 3 that the spray nozzle 16 and the blowing nozzle 17 are directed obliquely from above and from teh outside to the mouth edge 1a of the vessel. This ensures that coating proceeds continuously, starting from the mouth edge 1a, both on the surface adjacent to the end face and on the surface adjacent to the periphery.

Since, as mentioned, the nozzle holder 14 only rotates through approximately 90 degrees, the spray nozzle 16 and blowing nozzle 17 can be fed via hose lines.

A central bore 19 leads into the stationary nozzle mandrel 12 and is connected to an air supply line 19 in the supporting spindle 7. From there, the air supplied flows ou into air nozzles 20 which are directed obliquely rearwards and are distributed on the periphery and which are, for example, pointed towards the vessel mouth 1. They generate an air flow which is directed out of the vessel mouth and which carries with it the spray particles and solvent vapors entering the vessel mouth and transports them into a suction bell 21 surrounding the entire vessel mouth 1 and substantially closed off relative to the outside.

The spray nozzle 16 and the blowing nozzle 17 project into the suction bell 21 through orifices. One or more ari suction lines 22 lead ou of the suction bell 21 through the supporting spindle 7 and suck the spray residues and solvent vapors ou of the suction bell 21, so that they cannot escape into the environment.

After a coating operation, the lifting slide 5 moves upwards and releases the coated vessel mouth 1, so that the vessel 2 can be exchanged. At the same time, the nozzle holder 14 returns to its initial position as the result of a backward rotation through approximately 90 degrees. As soon as a new vessel 2 has been brought into the treatment position, which can be carried out, for example, by means of an automatic transport arrangement, the nozzle mandrel 12 is lowered into the vessel mouth 1 with its centering portion 13 conical at the lower end. The centering portion 13 centers the vessel mouth 1 to be coated and thus constitutes the vessel retainer, round which the nozzle holder 14 rotates.

In order to change over to other vessel dimensions, the nozzle mandrel 12, the nozzle holder 14 and the suction bell 21 can be exchanged easily. In many cases, it is even sufficient to exchange the nozzle mandrel 12 only and adjust the spray nozzle 16 and blowing nozzle 17 on the nozzle holder 14 to match them to different dimensions of the vessel mouth 1. A change-over to different vessel heights can be made by adjusting the supporting column 7 in the clamping sleeve 6. Appropriately, the toothing 9 is made wide enough to ensure that there is no need to adjust the drive parts 10, 11.

In contrast to the exemplary embodiment illustrated, it is also possible to do without a height adjustment of the nozzle mandrel 12 and, instead, feed the vessel 2 to the nozzle mandrel 12 from below. Centering can also be carried out on the outside of the vessels 2, but the advantage of centering via the nozzlel mandrel 12 is that dimensional variations in the vessels 2 are not detrimental to the exact positioning of the vessel mouth 1.

The air stream generated by the air nozzles 20 and directed out of the vessel mouth 1 prevents coating material from penetrating inside the vessel, even when the centering portion 13 of the nozzle mandrel 12 does not fit exactly and sealingly into the vessel neck. Dimensional variations of the vessel neck which are a result of production are therefore also acceptable within a wide range.

The working position of the vessels to be coated is independent of location in space and, for example, can also be horizontal.

It is expedient to feed dried air or another moisture-free gas into the supply vessel for the silane solution, in order to prevent the silane solution nfrom reacting with the atmospheric moisture.

What is claimed is:

1. Apparatus for spraying mouths of vessels having necks with coating material as the vessels are indexed into alignment with the apparatus, the apparatus comprising:

a support for positioning the apparatus above the vessel mouth, the support including a spindle;

a mandrel for insertion into the neck, the mandrel having means therein for ejecting gas upwardly toward the bottle mouth to prevent coating material from entering the vessel;

means mounting the mandrel on the spindle for selective movement into and out of the neck of the vessel;

nozzle support means mounted on the spindle, extending laterally of the mandrel and being selectively rotatable about the mandrel;

a plurality of coating material nozzles and air nozzles mounted on the nozzle support means and having openings oriented tangentially to the mouth for directing stream of coating material and air onto the mouth of the vessel to coat the mouth and dry the coating material, and means for rotating the nozzle support means through an arc less than 360° in order to completely coat the mouth.

2. The apparatus of claim 1, wherein there are four nozzles and the arc through which the nozzle support means rotates is approximately 90°.

3. The appartus of claim 1, further including a suction bell surrounding both the neck of the vessel and the coating material nozzles and air nozzles, the suction bell incluiding a suction nozzle extending up through the spindle for drawing off any coating material suspended in air adjacent the neck and mouth.

4. The apparatus of claim 1, wherein the coating material is silane.

5. An apparatus for spraying a coating material on a mouth of a vessel, wherein the mouth has a central axis and an edge, the coating material being sprayed adjacent the edge, the apparatus comprising:

at least one spray nozzle (16);

means for positioning the vessel (2);

means for rotating the spray nozzle (16) and the vessel (2) one relative to the other in a rotational direction about the central axis of the vessel mouth (1);

a blowing nozzle (17) arranged next to the spray nozzle (16), the blowing nozzle trailing the spray nozzle (16) with respect to the rotational direction, the blowing nozzle being directed toward the edge of the mouth (1); and several air nozzles (20) for positioning inside the vessel (2) to produce an air stream from inside the vessel directed toward the vessel mouth (1).

6. The apparatus according to claim 5, wherein the spray nozzle (16) is directed approximately tangentially to the edge of the vessel mouth (1).

7. The apparatus according to claim 5, wherein the blowing nozzle (17) is directed approximately tangentially to the edge of the vessel mouth (1).

8. The apparatus according to claim 5, wherein the spray nozzle (16) and the blowing nozzle (17) are directed obliquely from above and from the outside to the edge of the vessel mouth (1).

9. The apparatus according to claim 5, wherein several nozzle units (15), each consisting of a spray nozzle (16) and of a blowing nozzle (17), are distributed around the periphery of the vessel mouth (1).

10. The apparatus according to claim 5, wherein a nozzle mandrel (12) which projects into the vessel mouth (1) and is connected to an air supply line (19) has, distributed on its periphery, the air nozzles (20) which air nozzles are directed rearward toward the vessel mouth (1), the vessel mouth (1) being surrounded by a suction bell (21) which is substantially closed with respect to the exterior thereof and is equipped with a suction line (22).

11. The apparatus according to claim 5, wherein the vessel (2) is held in a vessel retainer.

12. The apparatus according to claim 11, wherein the nozzle mandrel (12) has a centering portion (13) which fits into the vessel neck so as to constitute the vessel retainer.

13. The apparatus according to claim 11, wherein the nozzle mandrel (12) is fastened to a vertically moveable lifting slide (5), and wherein a nozzle holder (14) carrying the spray nozzle (16) and the blowing nozzle (17) is mounted so as to be rotatable and driveable about the axis of the nozzle mandrel (12).

14. The apparatus according to claim 13, wherein the nozzle mandrel (12) is attached exchangeably to the end face of a supporting column (7), and wherein the nozzle holder (14) is attached exchangeably to the end face of a bushing (8) mounted rotatably on the supporting column (7) and connected to a drive device (10, 11).

15. The apparatus of claim 5, wherein the coating material sprayed by the apparatus is silane.

* * * * *